US012641059B2

(12) United States Patent
Decraene et al.

(10) Patent No.: US 12,641,059 B2
(45) Date of Patent: *May 26, 2026

(54) METHODS AND DEVICES FOR PROTECTING A STREAM OF PACKETS

(71) Applicant: ORANGE, Issy-les-Moulineaux (FR)

(72) Inventors: Bruno Decraene, Chatillon Cedex (FR); Isabelle Athias, Chatillon Cedex (FR)

(73) Assignee: ORANGE, Issy-les-Moulineaux (FR)

( * ) Notice: Subject to any disclaimer, the term of this patent is extended or adjusted under 35 U.S.C. 154(b) by 127 days.

This patent is subject to a terminal disclaimer.

(21) Appl. No.: 18/249,840

(22) PCT Filed: Oct. 20, 2021

(86) PCT No.: PCT/FR2021/051829
§ 371 (c)(1),
(2) Date: Apr. 20, 2023

(87) PCT Pub. No.: WO2022/084625
PCT Pub. Date: Apr. 28, 2022

(65) Prior Publication Data
US 2023/0421536 A1 Dec. 28, 2023

(30) Foreign Application Priority Data

Oct. 22, 2020 (FR) ...................................... 2010856

(51) Int. Cl.
*H04L 9/40* (2022.01)
(52) U.S. Cl.
CPC ...... *H04L 63/0245* (2013.01); *H04L 63/0428* (2013.01); *H04L 63/1458* (2013.01); *H04L 2463/141* (2013.01)

(58) Field of Classification Search
CPC ............. H04L 63/1458; H04L 63/0428; H04L 63/0245; H04L 2463/141
(Continued)

(56) References Cited

U.S. PATENT DOCUMENTS 7,188,366 B2 * 3/2007 Chen ................... H04L 63/1408
713/153
7,411,957 B2 * 8/2008 Stacy .................. H04L 63/1458
713/181
(Continued)

FOREIGN PATENT DOCUMENTS

CN 106357685 A 1/2017
WO 2006124009 A2 11/2006

OTHER PUBLICATIONS

English translation of the Written Opinion of the International Searching Authority dated Jan. 24, 2022 for corresponding International Application No. PCT/FR2021/051829, filed Oct. 20, 2021.
(Continued)

*Primary Examiner* — Amare F Tabor
(74) *Attorney, Agent, or Firm* — David D. Brush; Westman, Champlin & Koehler, P.A.

(57) ABSTRACT

A method for protecting a stream of packets in a network composed of packet router nodes and stream transmitter and receiver nodes. The receiver node is connected to a router node handling routing of a packet to the receiver node according to an expected value of a protection parameter included in at least one field of a packet of the stream. The method is implemented by a device associated with the receiver node and includes: transmitting to the router node connected to the receiver node a message containing the expected value of the protection parameter. A method is also provided for filtering a stream of packets, which is implemented by the router node connected to the receiver node and includes: receiving from a device associated with the
(Continued)

Figure 1:
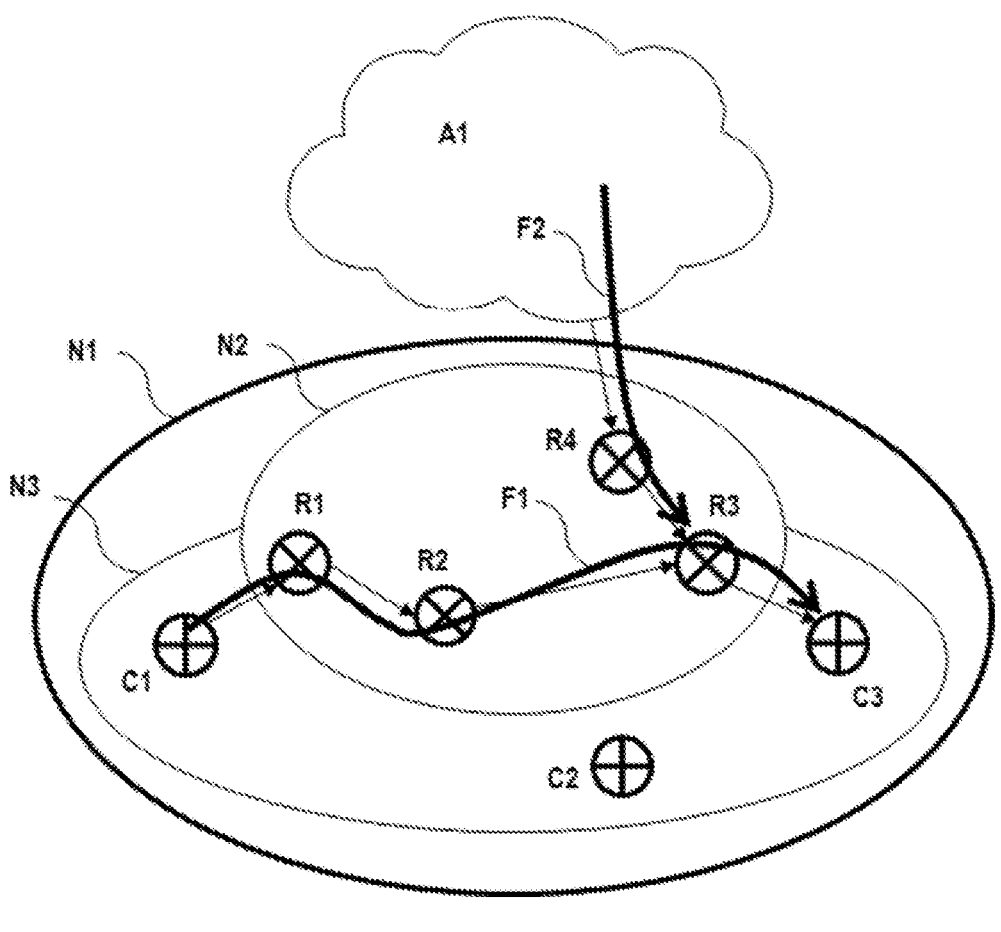

receiver node a message containing the expected value of the protection parameter, and filtering packets not containing the expected value of the parameter.

16 Claims, 2 Drawing Sheets

(58) Field of Classification Search
USPC .......................................................... 726/13
See application file for complete search history.

(56) References Cited

U.S. PATENT DOCUMENTS

| | | | | |
|---|---|---|---|---|
| 7,627,677 | B2 * | 12/2009 | Raz ...................... | H04L 63/1458 |
| | | | | 709/225 |
| 8,281,400 | B1 * | 10/2012 | Eater ................... | H04L 63/1458 |
| | | | | 705/52 |
| 9,398,043 | B1 * | 7/2016 | Yang ................... | H04L 63/1441 |
| 9,479,522 | B1 * | 10/2016 | Cirkovic ............. | H04L 63/1416 |
| 10,382,480 | B2 * | 8/2019 | Reddy ................. | H04L 63/0428 |
| 10,469,530 | B2 * | 11/2019 | Bharrat ............... | H04L 63/1458 |
| 11,968,226 | B1 | 4/2024 | Chychi et al. | |
| 12,120,128 | B1 | 10/2024 | Iqbal et al. | |
| 2006/0010389 | A1 * | 1/2006 | Rooney ............... | H04L 63/1458 |
| | | | | 715/736 |
| 2007/0166051 | A1 | 7/2007 | Sebayashi et al. | |
| 2013/0269031 | A1 | 10/2013 | Nakao et al. | |
| 2014/0373140 | A1 | 12/2014 | Waters, Jr. et al. | |
| 2016/0088068 | A1 * | 3/2016 | Toy ..................... | H04L 67/1097 |
| | | | | 709/219 |
| 2017/0070531 | A1 * | 3/2017 | Huston, III ......... | H04L 63/0428 |
| 2018/0131718 | A1 | 5/2018 | Chien | |
| 2018/0248909 | A1 * | 8/2018 | Bharrat ............... | H04L 63/1458 |
| 2019/0020686 | A1 * | 1/2019 | Cohen ................. | H04L 41/0893 |
| 2020/0021994 | A1 | 1/2020 | Ranjbar et al. | |
| 2020/0162506 | A1 * | 5/2020 | Frydman ................. | H04L 67/10 |
| 2021/0320943 | A1 | 10/2021 | St. Pierre | |

OTHER PUBLICATIONS

Loibl, C. et al., "Dissemination of Flow Specification Rules draft-ietf-idr-rfc5575bis-26", IDR Working Group, Aug. 12, 2020.
Enns, R. et al., "Network Configuration Protocol (NETCONF)", RFC 6241 Request for Comments, Internet Engineering Task Force (IETF), ISSN: 2070-1721, Jun. 2011.
Bierman A. et al., "RESTCONF Protocol", Request for Comments: 8040, Internet Engineering Task Force (IETF), ISSN: 2070-1721, Jan. 2017.
Marques, P. et al., "Dissemination of Flow Specification Rules", Network Working Group, Request for Comments: 5575, Aug. 2009.
Filsfils C. et al., "RFC 8754 IPv6 Segment Routing Header (SRH)", RFC 8754, Internet Engineering Task Force (IETF), ISSN: 2070-1721, Mar. 2020.
U.S. Appl. No. 18/249,844, filed Apr. 20, 2023, entitled "Method and device for prioritising packet flows", 24 pages.
International Search Report dated Jan. 26, 2022 for corresponding International Application No. PCT/FR2021/051828, filed Oct. 20, 2021.
Written Opinion of the International Searching Authority dated Jan. 26, 2022 for corresponding International Application No. PCT/FR2021/051828, filed Oct. 20, 2021.
Pierre-Edouard Fabre, "Using network resources to mitigate volumetric DDoS", Dec. 13, 2018 (Dec. 13, 2018), Retrieved from the Internet: URL:https://tel.archives-ouvertes.fr/tel-01983197/document, XP055721332.
International Search Report dated Jan. 24, 2022 for corresponding International Application No. PCT/FR2021/051829, filed Oct. 20, 2021.
Written Opinion of the International Searching Authority dated Jan. 24, 2022 for corresponding International Application No. PCT/FR2021/051829, filed Oct. 20, 2021.
Non-Final Office Action for U.S. Appl. No. 18/249,844, mailed Feb. 24, 2025, 11 pages.
Final Office Action for U.S. Appl. No. 18/249,844, mailed Jul. 24, 2025, 14 pages.
Non-Final Rejection for U.S. Appl. No. 18/249,844, mailed Dec. 11, 2025, 13 pages.

* cited by examiner

METHODS AND DEVICES FOR PROTECTING A STREAM OF PACKETS

CROSS-REFERENCE TO RELATED APPLICATIONS

This Application is a Section 371 National Stage Application of International Application No. PCT/FR2021/051829, filed Oct. 20, 2021, which is incorporated by reference in its entirety and published as WO 2022/084625 A1 on Apr. 28, 2022, not in English.

1. FIELD OF THE INVENTION

The invention lies in the field of telecommunications, and more particularly of networks consisting of routers routing IP packets.

2. PRIOR ART

In many VPN (Virtual Private Network) uses, and in particular for SD-WAN (Software Defined Wide Area Network) offerings, which are gaining in popularity nowadays, IPsec tunnels are established between sites of the VPN of a client, for example a company established over multiple sites. These IPsec tunnels are transported by an IP or MPLS network that has no knowledge of these IPsec tunnels. This "transport" network is typically the Internet owing to its ubiquity, high speed and low cost.

All users of the transport IP network are also able to send packets to client sites. In the case of the Internet, a very large number of users (of the order of a billion) are therefore able to send packets, potentially at high speed. Any attacker on the Internet is thus able to send a large quantity of packets to a client site and thus saturate the client interface and/or the client router, thus carrying out a denial of service (DOS) attack. The attacker is also able to use many different traffic sources all directed to a single destination—the client site receiving the IPsec packets—thus carrying out a distributed denial of service (DDOS) attack. As a result, the IPsec tunnel no longer has any resources and almost all of its traffic is destroyed upstream of its destination, typically on the last router of the IP/MPLS transport network.

One known solution is to deploy protection equipments able to analyze all flows/packets directed toward the client site, to attempt to distinguish legitimate traffic from DDOS traffic, and to filter the DDOS traffic. This solution has numerous drawbacks.

This solution is based on brute-force analysis of all of the packets of all of the flows. It is therefore intrinsically expensive and does not scale up to reality. Moreover, the work needed for analysis and protection is far more complicated than the work of sending attack packets. As a result, the defender is intrinsically in an inferior position compared to the attacker.

This solution is not able to guarantee that it is/will be able to distinguish legitimate packets or flows from attack packets or flows. It is based on heuristics following previous attacks or on the fact that the attacker is likely to send relatively similar packets/flows in order to make his life easier, to optimize the work of the attacking equipments and/or uses equipments over which he does not have full control (reflection attacks). However, a sufficiently motivated attacker with enough resources (paid or stolen) has every chance of evading detection.

Finally, this solution has to be sized for the largest possible attack, even if this is experienced only once a year.

This maximum cost is difficult to amortize across all smaller attacks. However, if the operator does not make this investment, firstly the client is no longer able to trust the offering and secondly the attacker is aware of the weak point.

One of the aims of the invention is to remedy these drawbacks of the prior art.

3. SUMMARY OF THE INVENTION

The invention aims to improve the situation by way of a method for protecting a packet flow in a network composed of router nodes routing packets and of transmitter and receiver nodes transmitting and receiving the flow, the receiver node being connected to a router node processing the routing of a packet destined for the receiver node on the basis of an expected value of a protection parameter contained in at least one field of a packet of the flow, the method being implemented by a device associated with the receiver node and comprising:

transmitting a message comprising the expected value of the protection parameter, destined for the router node connected to the receiver node.

In a conventional network, routers are managed by an operator who has no knowledge of the legitimacy of the flows passing through the routers, since these flows are established by third-party entities. A third-party entity is for example a company managing transmitter and receiver nodes transmitting and receiving packet flows between sites or machines of the company, these transmitter and receiver nodes being collectively called client nodes. This company is a client of the operator of the router nodes, and/or of what is called an OTT (Over The Top) provider, that is to say a provider using the resources and the capacities of these same routers for commercial purposes, which routers however remain managed by their operator.

By virtue of the invention, the flows that are conveyed are protected by the routers, whereas these flows are not necessarily managed (that is to say generated, transmitted or received) by the operator of the routers. The message comprising the value of the protection parameter may be a message sent directly or indirectly, from a flow management equipment to a router node. This flow management equipment is associated with the receiver node receiving a flow, that is to say it may be contained in a client node, that is to say in the transmitter node or in the receiver node, or in another entity such as for example an equipment for monitoring or controlling or configuring the client nodes. This may be for example an SD-WAN network controller node. The packet processing performed by the router depends on the protection parameter received in the message. For example, if a packet received by the router does not exhibit the expected value of the parameter in a determined field associated with the flow, it is processed according to a policy that is determined in advance, that is to say for example that it is destroyed without being transmitted by the router, or that it is assigned a lower priority (QoS), or that it is delayed, etc. This does not rule out, if on the contrary the packet exhibits the expected value of the protection parameter, another aspect of the abovementioned policy being able to favor the flow to which the packet belongs, for example by increasing its priority.

It will be understood that only the flows specified or expected by the client nodes are routed to a client node by a router node, without being modified unfavorably (the modification possibly ranging up to destroying all of the packets of the flow). This unfavorable modification of a flow is denoted using the term "filtering" hereinafter. Even if the packets received by the router node indicate the destination address of the client node, they are therefore not routed thereto normally or using the default process if these packets do not also exhibit the expected value of the protection parameter, in the one or more expected fields. A DOS or DDOS attack on the client node thus becomes impossible.

According to one aspect of the method for protecting a packet flow, the transmission of the message comprising the expected value of the protection parameter is triggered by obtaining information indicative of congestion between the transmitter node and the receiver node.

By virtue of this aspect, the effect of an attack is able to be neutralized even after it has started. Indeed, one of the first effects of an attack is the increase in the volume of data destined for the receiver node. This increase is able to be detected on several levels, for example at the level of the transmitter node, which no longer manages to communicate correctly with the receiver node, at the level of a router node, on which an excessive volume of data destined for the receiver node arrives in transit, or at the level of the receiver node itself, which receives an excessive volume of data. If the congestion is not detected at the level of the device transmitting the message of the protection parameter, the information indicative of congestion is transmitted thereto. In this mode, the method according to the invention represents a solution in response to an attack.

It will also be understood that the value of the parameter may be changed as frequently as necessary, including if the attacker discovers the correct value of the protection parameter.

According to one aspect of the method for protecting a packet flow, a new message is retransmitted with a new value of the protection parameter after a defined period has expired.

By virtue of this aspect, even if an attacker discovers the current value of the protection parameter, it will have changed even in the event of an attack at the level of the receiver node, on the condition that this attack does not prevent the message from being retransmitted. In this mode, the method according to the invention represents a solution for preventing an attack.

According to one aspect of the method for protecting a packet flow, the message comprises multiple expected values of the protection parameter, each value corresponding to a different period of use.

By virtue of this aspect, even if an attacker discovers the current value of the protection parameter, it is replaced with another value that is provided in advance.

In one mode, this may be carried out in a manner planned and synchronized with the transmitter of the flow, by way of an automatic change in the value of the protection parameter after a period determined in advance, without it being necessary to retransmit the message. This is particularly advantageous if an attack in progress makes it impossible to transmit a new message. In this mode, the method according to the invention represents a solution both in response to and for preventing an attack.

In another mode, this may also be carried out in response to an attack, without it being necessary to retransmit a new message, by way of a change in the value of the protection parameter, which is for example triggered by obtaining information indicative of congestion between the transmitter node and the receiver node. In this mode, the router node also has to transmit a message to inform the transmitter node transmitting the flow of the time from which the value of the protection parameter has changed.

The invention also aims to improve the situation by way of a method for filtering a packet flow in a network composed of router nodes routing packets and of transmitter and receiver nodes transmitting and receiving the flow, the receiver node being connected to a router node processing the routing of a packet destined for the receiver node on the basis of an expected value of a protection parameter contained in at least one field of a packet of the flow, the method being implemented by the router node connected to the receiver node and comprising:

receiving a message comprising the expected value of the protection parameter, from a device associated with the receiver node, filtering packets not comprising the expected value of the protection parameter.

It will be understood that, by virtue of this method, the flows specified or expected by the client nodes are also expected by the receiver node connected to the receiver node. If these flows make it as far as this router node while being destined for the client receiver node, they are routed to the client receiver node without being filtered only if the packets of such flows exhibit the expected value of the protection parameter.

A DOS or DDOS attack on a client node thus becomes impossible.

The device initiating the message comprising the value of the protection parameter forms part of the same administrative domain as the client receiver node, this domain being for example that of the client network. The router node performing the filtering, connected to the receiver node, is able to receive this message directly from the client network. In another embodiment, it is also able to receive it indirectly, if for example an intermediate equipment has to modify the format thereof and/or if it is not possible for the router node to receive signaling directly from the client network. This intermediate equipment may be a flow controller forming part of the operator network comprising the router nodes, and not comprising the transmitter and receiver nodes, to which the device associated with the receiver node is able to send signaling.

According to one aspect of the method for filtering a packet flow, the filtering comprises blocking the packets, or destroying the packets, or lowering the priority of the packets. By virtue of this aspect, in accordance with a policy applied by the operator and decided upon with or without consultation with the client, when a packet does not exhibit the correct value of the protection parameter, either the priority of the packet is lowered, thereby delaying the arrival of the packets of the flow on the receiver client node, allowing it to continue to receive other flows, or all of the packets of the flow are blocked, or destroyed without being transmitted, thereby completely sparing the receiver client node from any problem that this flow might cause thereto.

According to one aspect of the method for filtering a packet flow, said method furthermore comprises transmitting the message comprising the expected value of the protection parameter to a router node neighboring the router node connected to the receiver node.

This aspect makes it possible to filter flows at the level of a node neighboring the router node connected to the client node, preferably upstream of the flow. This is advantageous in the case of a DDoS attack, in which the attacking flows arrive on the last router node from multiple immediately neighboring router nodes. The load in terms of filtering the flows is thus better distributed in the network of routers. The transmission of the message, which is equivalent to the transmission of a filtering command, may be triggered only upon a threshold being reached, for example when the volume of data received by the router node or on its upstream interface reaches a threshold beyond which the operation of the router node or of its upstream interface is jeopardized.

According to one aspect of the method for protecting and of the method for filtering a packet flow, the protection parameter is contained in the destination IPv6 address of the packets of the flow.

This aspect makes advantageous use of an existing particular feature of IPv6 addresses. Indeed, the last bits of an IPv6 address, for example the last 64 bits, may be determined and modified as desired by the user of the flow, for example the client using the transmitter and receiver nodes, client of the operator network formed by the router nodes, without impacting the routing of packets to their final destination. These 64 bits represent a very large number of possible values for the protection parameter, thereby making them difficult or even impossible for an attacker to discover.

According to one aspect of the method for protecting and of the method for filtering a packet flow, the flow is an IPsec tunnel or an IP tunnel.

By virtue of this aspect, the protection solution covers the flows that are most common and most important, as they are typically destined for multiple recipients. Moreover, certain existing parameters specific to these tunnels may advantageously be used as protection parameter according to the invention. Some examples of IP tunnels are L2TP, GRE, UDP, SRv6 (Segment Routing IPv6).

According to one aspect of the method for protecting and of the method for filtering a packet flow, the at least one field comprising the protection parameter is one or more of the fields from a list comprising:

"Security Parameters Index" (SPI) of IPsec,
"Protocol" of IPv4,
"Next Header" of IPv6,
"Flow Label" of IPv6,
source IP address, or destination IP address, or source port, or destination port, of IPv4 or IPv6,
"Key" of GRE,
Segment List, or Segment List [n], or Tag, or HMAC TLV of Segment Routing IPv6 (SRv6).

By virtue of this aspect, the received flow transiting via the router node is able to be processed based on multiple protection parameters, this representing a combination that is more difficult to discover for an attacker, while at the same time providing greater flexibility to the transmitter/receiver transmitting/receiving the flow to adapt the solution to its use cases. Using a context-specific parameter (such as SPI, specific to IPsec) also gives better protection than a parameter present in all of the packets, regardless of context (such as IP address or port), because the attacker also has to discover the context (such as the type of tunnel the flow uses).

According to one aspect of the method for protecting and of the method for filtering a packet flow, the message comprising the expected value of the protection parameter is a message of one of the following protocols:

BGP Flow Spec,
NETCONF,
RESTCONF,
Command line interface (CLI),
SNMP,
API REST,
API.

By virtue of this aspect, the method according to the invention fits into an existing network architecture by reusing a communication protocol already used by router nodes.

The invention also relates to a device for protecting a packet flow in a network composed of router nodes routing packets and of transmitter and receiver nodes transmitting and receiving the flow, the receiver node being connected to a router node processing the routing of a packet destined for the receiver node on the basis of an expected value of a protection parameter contained in at least one field of a packet of the flow, the device being associated with the receiver node and comprising a receiver, a transmitter, a processor and a memory coupled to the processor with instructions intended to be executed by the processor for the purpose of:

transmitting a message comprising the expected value of the protection parameter, destined for the router node connected to the receiver node.

This device, which is able, in all of its embodiments, to implement the flow protection method that has just been described is intended to be implemented in an equipment of the sub-network composed of the transmitter and receiver nodes transmitting and receiving the flow, also called client network. It may form part of the receiver node or of the transmitter node, or form part of a management equipment of the client network, separate from the transmitter or receiver nodes transmitting or receiving the flow, for example an SD-WAN controller node if the client network is an SD-WAN network. In all cases, this device is associated with the receiver node, that is to say forms part of the same administrative domain.

The invention also relates to a device for filtering a packet flow in a network composed of router nodes routing packets and of transmitter and receiver nodes transmitting and receiving the flow, the receiver node being connected to a router node processing the routing of a packet destined for the receiver node on the basis of an expected value of a protection parameter contained in at least one field of a packet of the flow, the device being implemented in the router node connected to the receiver node and comprising a receiver, a transmitter, a processor and a memory coupled to the processor with instructions intended to be executed by the processor for the purpose of:

receiving a message comprising the expected value of the protection parameter, from a device associated with the receiver node,
filtering packets not comprising the expected value of the protection parameter.

This device, which is able, in all of its embodiments, to implement the flow filtering method that has just been described is intended to be implemented in a node of the sub-network composed of the router nodes, also called operator network. More specifically, this device forms part of the router node connected to the receiver node of the client network.

The invention also relates to a computer program comprising instructions that, when these instructions are executed by a processor, prompt said processor to implement the steps of the protection method that has just been described.

The invention also relates to a computer program comprising instructions that, when these instructions are executed by a processor, prompt said processor to implement the steps of the filtering method that has just been described.

The invention also targets an information medium able to be read by a protection device and comprising instructions of a computer program as mentioned above.

The invention also targets an information medium able to be read by a filtering device and comprising instructions of a computer program as mentioned above.

The abovementioned programs may use any programming language, and be in the form of source code, object code, or of intermediate code between source code and object code, such as in a partially compiled form, or in any other desirable form.

The abovementioned information media may be any entity or device capable of storing the program. For example, a medium may include a storage means, such as a ROM, for example a CD-ROM or a microelectronic circuit ROM, or else a magnetic recording means.

Such a storage means may be for example a hard disk, a flash memory, etc.

Moreover, an information medium may be a transmissible medium such as an electrical or optical signal, which may be routed via an electrical or optical cable, by radio or by other means. A program according to the invention may in particular be downloaded from a network such as the Internet.

Alternatively, an information medium may be an integrated circuit in which a program is incorporated, the circuit being designed to execute or to be used in the execution of the methods in question.

4. PRESENTATION OF THE FIGURES

Figures 2, 3:
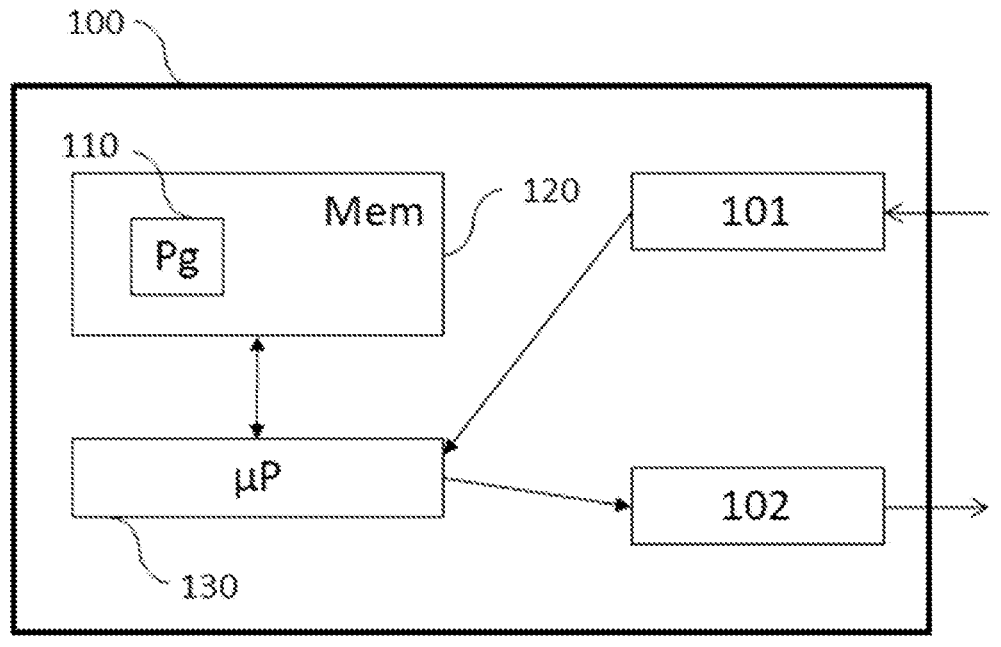

Other advantages and features of the invention will become more clearly apparent on reading the following description of one particular embodiment of the invention, which embodiment is given by way of simple illustrative and non-limiting example, and the appended drawings, in which:

FIG. 1 schematically shows a network comprising router nodes and client nodes according to the invention, in one particular embodiment, FIG. 2 presents one example of a structure of a protection device, implemented on the client network side, according to some aspects of the invention, FIG. 3 presents one example of a structure of a filtering device, implemented on the router network side, according to some aspects of the invention.

5. DETAILED DESCRIPTION OF AT LEAST ONE EMBODIMENT OF THE INVENTION

FIG. 1 schematically shows a network comprising router nodes and client nodes according to the invention, in one particular embodiment.

The network N1 comprises a subnetwork N2 composed of router nodes R1 to R4 managed by a telecommunications operator, called operator network, and a subnetwork N3 composed of client nodes C1 to C3 managed by a third-party entity independent of the operator, called client network. The operator network N2 is for example an IP/MPLS network, also called transport network. The client network N3 may be a VPN, SD-WAN, etc. network.

In one particular embodiment, a flow F1 is established between the client node C1 and the client node C3. The client node C1 is connected to the router node R1, the client node C3 is connected to the router node R3, and the flow F1 transmitted by the node C1 destined for the client node C3 takes a route B1 starting at the client node C1, passing through the router nodes R1, R2 and R3, and ending at the client node C3.

The client node C3 is able to receive other flows from other sources, such as for example a flow F2 transmitted by the source A1, taking or being intended to take a route B2 having the router node R3 and the client node C3 in common with the route B1. The source A1 may be any type of equipment able to connect to a router node of the operator network N2. For simplicity, the source A1 is illustrated by a cloud appearing outside the networks N2 or N3, but it may or may not form part of the operator network N2, or may or may not form part of the client network N3.

A problem arises when the flow F2 transmitted by the source A1 is not a flow expected by the client node C3 and exhibits a volume of data likely to degrade the operation of the client node C3. This problem is often called a denial of service attack, or a DoS attack, in the literature. The source A1, illustrated in FIG. 1 as being on its own for simplicity, may also be multiple, thereby aggravating the problem. Reference is then made to a distributed DoS attack, or DDoS attack. The multiple flows transmitted by the multiple source A1, in other words the DDoS attacker, may take different routes, but they all end up on the router node R3, which is the last router node before the node under attack, which is the client node C3.

In order to repel such an attack, the flows arriving on the router node R3 and that are not legitimately expected by the client node C3 and risk harming it, have to be filtered, that is to say either blocked or reduced in terms of their volume or in terms of their rate, or lowered in terms of priority (QoS). Lowering the priority of the flows is particularly advantageous if it is important to let through certain legitimate but unpredictable flows coming from the Internet, as long as an attack is not in progress. For this purpose, according to the invention, a flow must be able to provide the router node R3 with a particular parameter before being transmitted by the router node R3 to its destination, which is the client node C3. This protection parameter, which is comparable to a signature, must be known in advance to the router node R3. It is communicated in signaling from a device of the client network N3 destined for an entity of the transport network N2. According to the invention, multiple alternative methods allow the router node R3 to obtain the necessary information, including the protection parameter.

The router node R3 must be able to identify the client node and the flows to be protected. To this end, the signaling comprises either the destination address of the flows, which corresponds to the IP address of the client node C3, or other information for identifying the client node C3, such as a port number or interface number, a domain name (DNS), a cryptographic certificate, etc. Using an IPv6 address is particularly advantageous because this address is coded on a number of bits large enough to also include the protection parameter therein. If the signaling is transmitted directly by the client node C3, another way for the router node R3 to identify the client node C3 is through the identifier of the transmitter of the signaling, such as for example the originating IP address of a signaling packet or the interface where the signaling arrives.

Multiple signaling protocols to the router node R3 may be used:

A flow signaling protocol such as BGP FlowSpec (RFC5575 and its revision draft-ietf-idr-rfc5575bis "Dissemination of Flow Specification Rules") and its extensions;

A configuration protocol such as NETCONF (RFC 6241 "Network Configuration Protocol (NETCONF)", RESTCONF (RFC 8040 "RESTCONF Protocol", CLI (Command Line Interface) or SNMP;

A proprietary interface of API (Application Programming Interface) type.

The signaling source may be:

The client node C1 or the client node C3;

A client flow communication controller (for example an SD-WAN controller) in the network N3.

The signaling may transit via a router controller of the operator network N2, in cases where for example the routers of the network N2 are not able to receive signaling messages directly from the network N3. This controller then acts as an intermediate equipment that adapts the protocol or the format of the signaling message before retransmitting it to a router.

In one embodiment, the client node C1 sends its flow with the protection parameter of its choice (or of the choice of the client node C3). The router node R1 monitors the headers of new flows from the client node C1. The router node R1 discovers the protection parameter and signals it to the router node R3, directly or indirectly via a router controller of the operator network N2.

In one embodiment, after having received the protection parameter, the router node R3 communicates it to its immediately neighboring router nodes, that is to say the router nodes R2 and R4. Indeed, all of the flows destined for the client node C3 necessarily pass through one of the router nodes immediately upstream of the router node R3. The load in terms of filtering the flows destined for the client node C3 is thus distributed over multiple router nodes rather than over a single one.

In one embodiment, the communication of the protection parameter to an upstream router node may be triggered by a downstream router node when the volume of flows received by this router reaches a threshold that jeopardizes the downstream node or the link between the upstream router node and the downstream router node. The router node R3 thus protects itself by delegating the filtering load to the router node R4, which is useful because it is through this node that the flow F2 transits.

In one embodiment, the router node R4 may itself also communicate the protection code to an upstream router node (not illustrated in FIG. 1), recursively. The threshold for triggering this communication may depend on the capacities of the router node R4 and be different from that of the router node R3. It will be understood that it is thus possible to move the load in terms of filtering the flow F2 up to the first router node taken by the flow F2 in the network N2. It may thus be made easier to identify and locate the source A1, and the whole of the network N2 is then relieved from transporting the flow F2, which is not only of large volume but is intended to be destroyed.

In addition to being communicated to the transport network N2, the protection parameter is also inserted into one or more fields of the packets of the flow F1 before they are transmitted by the client node C1. In the simplest case, the protection parameter is inserted in a single field of a packet, but, in one variant embodiment, it may consist of multiple parts that are distributed in multiple fields of a packet.

In one embodiment, the protection parameter is contained in the destination IPv6 address of the packets of the flow F1, for example in the last 64 bits of the IPv6 address.

In one embodiment, the flow F1 is an IPsec tunnel and the protection parameter is contained in the SPI (Security Parameters Index) field. The advantage of the SPI field is that it is a field specific to IPsec tunnels, and that its value may be modified as needed without impacting the routing of the flow.

In one embodiment, the flow F1 is an IPsec tunnel and the protection parameter is distributed over multiple fields, preferably including the SPI field. The other fields that may be used are: the Protocol field (or the Next Header field in the case of IPv6), the source IP address field, the destination IP address field, the source port field, the destination port field. It is also possible to use certain SRv6 fields (Segment Routing IPv6, RFC 8754), such as for example Segment List, Segment List [n], Tag, HMAC TLV.

In one embodiment in which the flow is not an IPsec tunnel, the SPI field cannot be used but the other fields that have just been mentioned may be used. The Key field of GRE (Generic Routing Encapsulation) may also be used. Other fields specific to IPv6 packets may also be used, such as Routing Header, Destination option, or Authentication Header. For security and particularly in IPv4, it may be preferable to distribute the protection parameter over multiple fields including at least the Protocol field, because the other fields (IP addresses and ports) are easier to discover for an attacker.

One example of a structure of a device for protecting a packet flow, according to one aspect of the invention, is now presented with reference to FIG. 2.

The protection device 100 implements the method for protecting a packet flow of which various embodiments have just been described.

Such a device 100 may be implemented in a transmitter or receiver node transmitting or receiving the flow, or in a client flow communication controller (for example an SD-WAN controller).

For example, the device 100 comprises a receiver 101, a transmitter 102, a processing unit 130, equipped for example with a microprocessor µP, and controlled by a computer program 110, stored in a memory 120 and implementing the protection method according to the invention. On initialization, the code instructions of the computer program 110 are for example loaded into a RAM memory, before being executed by the processor of the processing unit 130.

Such a memory 120, such a processor of the processing unit 130, such a receiver 101 and such a transmitter 102 are able and configured to:

transmit a message comprising the expected value of the protection parameter, destined for the router node connected to the receiver node or recipient of the flow.

Advantageously, they are also able and configured to:

retransmit a new message with a new value of the protection parameter, after a defined period has expired.

One example of a structure of a device for filtering a packet flow, according to one aspect of the invention, is now presented with reference to FIG. 3.

The filtering device 200 implements the method for filtering a packet flow of which various embodiments have just been described.

Such a device 200 may be implemented in a router node routing a packet flow, for example the router node connected to a client node for which the flows are destined. For example, the device 200 comprises a receiver 201, a transmitter 202, a processing unit 230, equipped for example with a microprocessor µP, and controlled by a computer program 210, stored in a memory 220 and implementing the method for filtering a packet flow according to the invention. On initialization, the code instructions of the computer program 210 are for example loaded into a RAM memory, before being executed by the processor of the processing unit 230.

Such a memory 220, such a processor of the processing unit 230, such a receiver 201 and such a transmitter 202 are able and configured to:

receive a message comprising the expected value of the protection parameter, from a device associated with the receiver node, filter packets not comprising the expected value of the protection parameter.

Advantageously, they are also able and configured to:

transmit the message comprising the expected value of the protection parameter, to a neighboring router node.

The entities described and contained in the devices described with reference to FIGS. 2 and 3 may be hardware-based or software-based. FIGS. 2 and 3 illustrate just one particular way among a plurality of possible ways of implementing the algorithm described above with reference to FIG. 1. Specifically, the technique of the invention may be carried out equally well on a reprogrammable computing machine (a PC, a DSP or a microcontroller) executing a program comprising a sequence of instructions, as on a dedicated computing machine (for example a set of logic gates such as an FPGA or an ASIC, or any other hardware module).

If the invention is installed on a reprogrammable computing machine, the corresponding program (that is to say the sequence of instructions) will possibly be stored on a removable storage medium (such as for example a USB stick, a floppy disk, a CD-ROM or a DVD-ROM) or a non-removable storage medium, this storage medium being partially or completely readable by a computer or a processor.

The invention claimed is:

1. A protection method comprising:

protecting at least one packet in a network composed of router nodes routing packets including a first router node, transmitter nodes transmitting packets, and receiver nodes receiving packets including a first receiver node connected to the first router node, the protecting being implemented by a device associated with the first receiver node and comprising:

transmitting a message comprising an expected value of a protection parameter destined for the first router node, the first router node processing routing of said at least one packet destined for the first receiver node based on said expected value of said protection parameter being contained in at least one field of said at least one packet; and after expiration of a defined period since transmitting the message, transmitting a new message with a new value of the protection parameter.

2. The protection method as claimed in claim 1, wherein the transmitting the message comprising the expected value of the protection parameter is triggered by obtaining information indicative of congestion between the one of the transmitter nodes and the first receiver node.

3. A filtering method comprising:

filtering at least one packet in a network composed of router nodes routing packets including a first router node, transmitter nodes transmitting packets including a first transmitter node, and receiver nodes receiving packets including a first receiver node connected to the first router node, the filtering being implemented by the first router node and comprising:

receiving a message comprising an expected value of a protection parameter from a device associated with the first receiver node;

receiving said at least one packet from the first transmitter node, said at least one packet being destined for said first receiver node and comprising said protection parameter;

filtering said at least one packet when a value of said protection parameter does not correspond to said expected value;

after expiration of a defined period since receiving said message, receiving a new message from said device associated with the first receiver node comprising a new expected value of the protection parameter; and filtering at least one new packet received from the first transmitter node and destined for said first receiver node when said new value of said protection parameter does not correspond to said new expected value.

4. The filtering method as claimed in claim 3, wherein the filtering of the at least one packet and the filtering of the at least one new packet comprises blocking, or destroying, or lowering priority of the packets not comprising the expected value of the protection parameter.

5. The filtering method as claimed in claim 3, furthermore comprising transmitting the message comprising the expected value of the protection parameter to a router node neighboring the first router node connected to the first receiver node.

6. The filtering method as claimed in claim 3, wherein the protection parameter is contained in a destination Internet Protocol version 6 (IPv6) address of the at least one packet.

7. The filtering method as claimed in claim 3, wherein the flow is an Internet Protocol security (IPsec) tunnel or an Internet Protocol (IP) tunnel.

8. The filtering method as claimed in claim 3, wherein the at least one field comprising the protection parameter is one or more of the fields selected from a list consisting of:

"Security Parameters Index" (SPI) of Internet Protocol security (IPsec),

"Protocol" of Internet Protocol version 4 (IPv4),

"Next Header" of Internet Protocol version 6 (IPv6),

"Flow Label" of IPv6,

Source Internet Protocol (IP) address, or destination IP address, or source port, or destination port, of IPv4 or IPv6, "Key" of Generic Routing Encapsulation (GRE), Segment List, or Segment List [n], or Tag, or hash-based message authentication code (HMAC) tag-length-value (TLV) of Segment Routing IPv6 (SRv6).

9. The filtering method as claimed in claim 3, wherein the message comprising the expected value of the protection parameter is a message in accordance with a protocol selected from the group consisting of:

Border Gateway Protocol (BGP) Flow Spec,

Network Configuration Protocol (NETCONF),

Representational State Transfer Configuration (RESTCONF),

Command line interface (CLI),

Simple Network Management Protocol (SNMP),

Application Program Interface (API) Representational State Transfer Configuration (REST), and

API.

10. A device for protecting at least one packet in a network composed of router nodes routing packets including a first router node, transmitter nodes transmitting packets, and receiver nodes receiving packets including a first receiver node connected to the first router node, the device being associated with the first receiver node and comprising:

a receiver;

a transmitter;

at least one processor; and at least one memory coupled to the at least one processor with instructions stored thereon which when executed by the at least one processor implement a method comprising:

transmitting a message comprising an expected value of a protection parameter destined for the first router node, the first router node processing routing of said at least one packet destined for the first receiver node based on said expected value of said protection parameter being contained in at least one field of said at least one packet; and after expiration of a defined period since transmitting the message, transmitting a new message with a new value of the protection parameter.

11. A device for filtering at least one packet in a network composed of router nodes routing packets including a first router node, transmitter nodes transmitting packets including a first transmitter node, and receiver nodes receiving packets including a first receiver node connected to the first router node, the device being implemented in the first router node and comprising:

a receiver;

a transmitter;

at least one processor; and at least one memory coupled to the at least one processor with instructions stored thereon which when executed by the at least one processor implement a method comprising:

receiving a message comprising an expected value of a protection parameter from a device associated with the first receiver node;

receiving said at least one packet from the first transmitter node, said at least one packet being destined for said first receiver node and comprising said protection parameter;

filtering said at least one packet when a value of said protection parameter does not correspond to said expected value;

after expiration of a defined period since receiving said message, receiving a new message from said device associated with the first receiver node comprising a new expected value of the protection parameter; and filtering at least one new packet received from the first transmitter node and destined for said first receiver node when said new value of said protection parameter does not correspond to said new expected value.

12. At least one non-transitory computer readable information medium comprising instructions stored thereon which when executed by at least one processor of a protection device associated with a first receiver node implement a protection method comprising:

protecting at least one packet in a network composed of router nodes routing packets including a first router node connected to the first receiver node, transmitter nodes transmitting packets, and receiver nodes receiving packets including the first receiver node, the protecting comprising:

transmitting a message comprising multiple expected values of a protection parameter destined for the first router node, each expected value corresponding to a different period of use, the first router node processing routing of said at least one packet destined for the first receiver node based on one said expected values of said protection parameter being contained in at least one field of said at least one packet; and after expiration of a defined period since transmitting the message, transmitting a new message with a new value of the protection parameter.

13. The protection method as claimed in claim 1, wherein the protection parameter is contained in a destination Internet Protocol version 6 (IPv6) address of the at least one packet.

14. The protection method as claimed in claim 1, wherein the flow is an Internet Protocol security (IPsec) tunnel or an Internet Protocol (IP) tunnel.

15. The protection method as claimed in claim 1, wherein the at least one field comprising the protection parameter is one or more of the fields selected from a list consisting of:

"Security Parameters Index" (SPI) of Internet Protocol security (IPsec),

"Protocol" of Internet Protocol version 4 (IPv4),

"Next Header" of Internet Protocol version 6 (IPv6),

"Flow Label" of IPv6, source Internet Protocol (IP) address, or destination IP address, or source port, or destination port, of IPv4 or IPv6, "Key" of Generic Routing Encapsulation (GRE), Segment List, or Segment List [n], or Tag, or hash-based message authentication code (HMAC) tag-length-value (TLV) of Segment Routing IPv6 (SRv6).

16. The protection method as claimed in claim 1, wherein the message comprising the expected value of the protection parameter is a message in accordance with a protocol selected from the group consisting of:

Border Gateway Protocol (BGP) Flow Spec,

Network Configuration Protocol (NETCONF),

Representational State Transfer Configuration (REST-CONF),

Command line interface (CLI),

Simple Network Management Protocol (SNMP),

Application Program Interface (API) Representational State Transfer Configuration (REST), and

API.

* * * * *